United States Patent [19]

Eichenauer

[11] 4,248,070
[45] Feb. 3, 1981

[54] STEERING COLUMN AND IGNITION LOCK FOR MOTOR VEHICLE

[76] Inventor: Rudolf Eichenauer, Hollbergstrasse 1, D-6000 Frankfurt am Main, Fed. Rep. of Germany

[21] Appl. No.: 947,534

[22] Filed: Oct. 2, 1978

[30] Foreign Application Priority Data

Dec. 23, 1977 [DE] Fed. Rep. of Germany ....... 2757544

[51] Int. Cl.³ .............................................. B60R 25/02
[52] U.S. Cl. ..................................................... 70/252
[58] Field of Search .................. 70/252, 360, 186, 455

[56] References Cited

U.S. PATENT DOCUMENTS

| | | | |
|---|---|---|---|
| 1,622,500 | 3/1927 | Fairchild et al. | 70/252 |
| 1,699,973 | 1/1929 | Kenworthy | 70/252 |
| 1,730,396 | 10/1929 | Van Sickel | 70/252 X |
| 2,101,446 | 12/1937 | Neiman | 70/186 |
| 3,575,023 | 4/1971 | Shimizu | 70/252 |
| 3,629,818 | 12/1971 | Hirama et al. | 70/252 X |
| 3,650,131 | 3/1972 | Eichenauer | 70/252 |
| 3,877,265 | 4/1975 | Schaumberg | 70/455 X |
| 4,031,728 | 6/1977 | Eichenauer | 70/186 UX |

FOREIGN PATENT DOCUMENTS

| | | | |
|---|---|---|---|
| 1171779 | 6/1964 | Fed. Rep. of Germany | 70/252 |
| 1455522 | 4/1969 | Fed. Rep. of Germany | 70/252 |
| 2020359 | 11/1971 | Fed. Rep. of Germany | 70/252 |
| 2621857 | 12/1977 | Fed. Rep. of Germany | 70/252 |
| 1129183 | 10/1968 | United Kingdom | 70/252 |
| 1284393 | 8/1972 | United Kingdom | 70/252 |

*Primary Examiner*—Roy D. Frazier
*Assistant Examiner*—Carl F. Pietruszka
*Attorney, Agent, or Firm*—Kurt Kelman

[57] ABSTRACT

A coincidental lock for a motor vehicle comprises a key controlled lock cylinder mounted in the axial bore of a housing for rotation into selected operating positions. A lock bolt is mounted in a cross bore of the housing for displacement between a retracted and a locking position for the steering column of the vehicle. A spring biases the lock bolt into the locking position and a latch on the lock bolt maintains the lock bolt in the retracted position until the key has been withdrawn from the lock cylinder. An axially extending driver element is keyed to the lock cylinder for rotation therewith and is axially displaceable with respect to the lock cylinder into operative association with an electrical ignition circuit for starting the motor of the vehicle and is arranged to operate the circuit on rotation of the lock cylinder into a selected operating position. A control is arranged on the lock bolt for displacing the driver element axially upon movement of the lock bolt between the retracted and locking positions.

4 Claims, 6 Drawing Figures

STEERING COLUMN AND IGNITION LOCK FOR MOTOR VEHICLE

The present invention relates to improvements in a lock arrangement for a motor vehicle having a steering column. As is well known, combined steering column and ignition locks, also called coincidental locks, enable the steering column of a motor vehicle to be locked and unlocked simultaneously with the opening and closing of the ignition switch through actuation of a key controlled lock.

In my U.S. Pat. No. 4,031,728, dated June 28, 1977, whose disclosure is incorporated herein by way of reference, I have disclosed a lock arrangement of this general type comprising a housing defining an axial bore and a cross bore intersecting therewith, a key controlled lock cylinder mounted in the axial bore of the housing for rotation about the axis of the bore into selected operating positions, the key being insertable into the lock cylinder for rotation of the lock cylinder and withdrawable therefrom, the lock cylinder including an axially extending driver element projecting inwardly from the lock cylinder, an electrical ignition circuit means (not FIGS. 6-7) for starting the motor of the vehicle, the driver element extending into operative association with the ignition circuit means and being arranged to operate the circuit means on rotation of the lock cylinder into a selected one of the operating positions, and a lock bolt mounted in the cross core for displacement between a retracted position and a locking position upon withdrawal of the key from the lock cylinder. An operating spring biases the lock bolt into the locking position, the lock cylinder including a cam means for moving the lock bolt against the bias of the operating spring into the retracted position on rotation of the lock cylinder into another one of the selected operating positions and a latch means holds the lock bolt in the retracted position until the key has been withdrawn from the lock cylinder.

In a known device, the axially extending driver element operates as a rotary switch for the electrical circuit of the vehicle, the axial displacement thereof in the driving or ready-to-lock position of the lock causing actuation of a buzzer or warning signal to warn the driver upon opening of the car door that the key has not yet been withdrawn from the lock.

In the known lock arrangements, the buzzer or warning signal is terminated by the axial displacement of the lock cylinder upon withdrawal of the key therefrom since the driver element is fixedly mounted on the lock cylinder and is axially displaced therewith. On the other hand, when it is desired to actuate the warning signal again, the driver element must be inwardly displaced upon insertion of the key in the lock cylinder or by turning of the cylinder with the inserted key.

Thus, in the known locks, the operation of the warning signal depends on the axial displacement of the lock cylinder.

It is the primary object of this invention to provide a lock arrangement wherein the electrical actuation of the warning signal may be effected by the incremental movement of the lock bolt, regardless of the axial position of the lock cylinder.

This and other objects are accomplished with an axially extending driver element which is keyed to the lock cylinder for rotation therewith and is axially displaceable with respect to the lock cylinder, the axial displacement of the driver element being controlled by means arranged on the lock bolt for displacing the driver element axially upon movement of the lock bolt between the retracted and locking positions.

The above and other objects, advantages and features of the present invention will become more apparent from the following detailed description of certain now preferred embodiments thereof, taken in conjunction with the accompanying drawing wherein FIG. 1 shows an axial section of one embodiment of a steering lock according to this invention, with the lock cylinder in partial section, the key being inserted and the steering column locking bolt being retracted, the lock cylinder being rotated into the locking position but the key not yet withdrawn so that the lock is in the ready-to-lock position;

Figure 1:
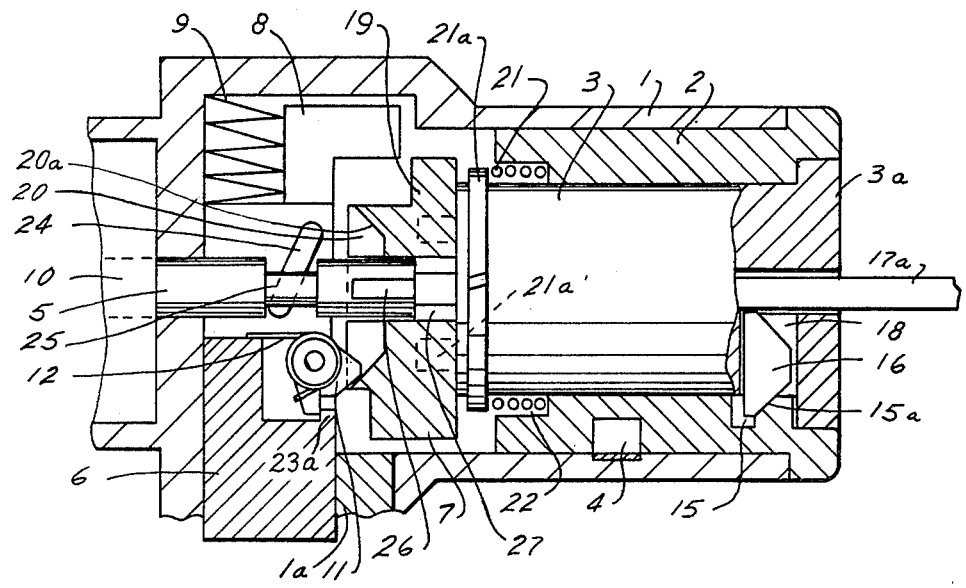

Referring now to the drawing and first to FIGS. 1 to 4, there is shown steering lock housing 1 having a bore holding lock barrel 2 which, in turn, has an axial bore receiving lock cylinder 3 for rotation in the lock barrel and axial displacement therein.

The lock barrel and cylinder are held against unauthorized removal from the housing by leaf spring 4 in a generally known manner. The outer end of lock barrel 2 defines a recessed chamber of enlarged diameter which receives head 3a of cylinder 3.

Figure 4:
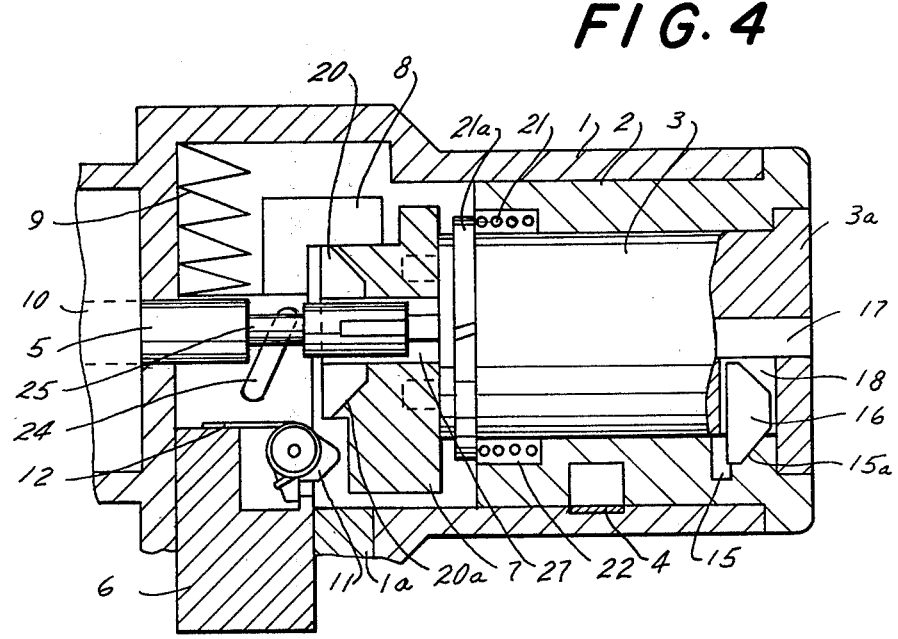
FIG. 4 is a view similar to that of FIG. 1, showing the lock in the locking position and the lock cylinder in the ready-to-rotate position.

Housing 1 also has a cross bore intersecting the axial bore in lock barrel 2 and holding retractible lock bolt 6 which is slidable in the cross bore between a retracted position shown in FIG. 1 and a locking position shown in FIG. 4. In the locking position, a steel tip or keeper of the bolt (not shown) engages a matching recess in the steering column (not shown) and thus locks the steering column against movement in a well known manner forming no part of the invention. Also, the lock housing carries a box holding electrical ignition circuit means 10 for starting the motor of the vehicle, an axially extending driver element 5 projecting inwardly from lock cylinder 3 into operative association with the ignition circuit means and being arranged to operate the circuit means on rotation of the lock cylinder into a selected operating position. A switch box of any suitable or conventional design may be used for actuating the ignition and, if desired, other operations of the vehicle. Since coincidental locks combining control of the steering column and ignition are well known, circuitry 10 has not been further illustrated or described, nor its actuation by driver element 5. As illustrated driver element 5 of lock cylinder 3 has a portion extending through elongated slot 23 in lock bolt 6 and an end of the driver element passes through a bore in housing 1 into ignition circuit means 10 to enable the driver element to operate the circuit means.

With flat ignition key 17a removed from keyhole 17 in lock cylinder 3 and the lock cylinder in the OFF-position shown in FIG. 4, operating coil spring 9 slides bolt 6 forwardly in the cross bore into the locking position of the lock bolt.

When it is desired to operate the vehicle, ignition key 17a is inserted into the keyhole 17 extending axially through the lock cylinder and the cylinder is turned by the key from the OFF-position into a ready-to-drive position. During this rotary movement of lock cylinder 3, cam means 7, which extends radially from the cylinder, engages cam follower 8 on bolt 6 to retract the bolt against the bias of spring 9 into the position shown in FIG. 1 wherein the steering column is unlocked. The cam means comprises a control ring 19 on lock cylinder 3 facing lock bolt 6 and defines conical recess 20 wherefrom there extends axial bore 27 receiving an end of driver element 5 opposite the end extending into the ignition circuit means. Axial bore 27 is of polygonal cross section and slidably receives a portion of the driver element of like cross section whereby the driver element is keyed to lock cylinder 3 for rotation therewith and is axially displaceable with respect to the lock cylinder. For proper guidance of the driver element during axial displacement, diametrically opposed ribs 26 of the driver element engage in corresponding guideways in bore 27.

Figure 2:
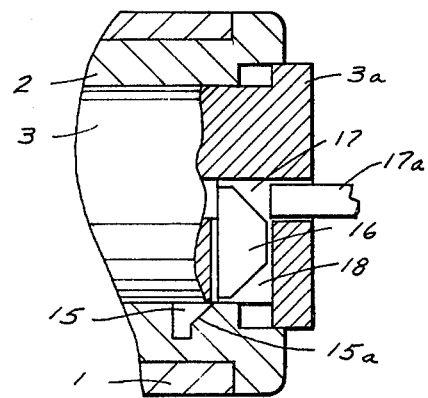
FIG. 2, is a partial axial section showing only the outer end of the lock, the lock cylinder being outwardly displaced axially during withdrawal of the key.
Figure 3:
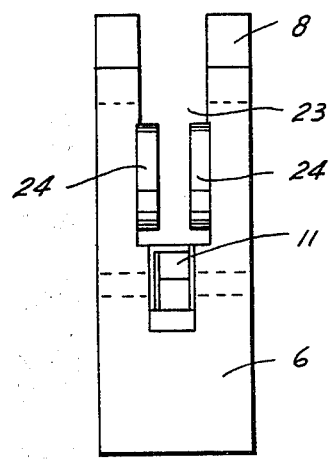
FIG. 3 illustrates a front view of the lock bolt.

Latch 11 is mounted on lock bolt 6 in its elongated slot 23, the illustrated latch means being constituted by a lever arm pivotal about an axis extending substantially perpendicular to the lock cylinder and biased counterclockwise by a soft spiral spring, the bias of the soft latch spring 12 being opposite to that of relatively hard coil spring 9 but being much weaker. Shoulder 23a extending into the elongated bolt slot adjacent latch 11 forms an abutment delimiting the pivotal movement of the latch under the bias of spring 12. The rest position of latch 11 under the bias of spring 12 is shown in FIG. 4. When lock cylinder 3 is turned and cam 7 engages cam follower 8 to raise lock bolt 6 into the retracted position, rim 20a of control ring 19, which defines conical recess 20, will cause latch 11 to be turned slightly clockwise to permit passage of the bolt, whereupon the latch will immediately snap back into the conical recess under the bias of spring 12. When the lock bolt reaches the fully retracted position, an oblique face of latch 11 will engage the wall of conical recess 20 (see FIG. 1) and will hold the lock bolt in retracted position until the key has been withdrawn from the lock cylinder even when cam 7 no longer engates cam follower 8. At the same time, the strong bias of operating spring 9 will hold the latch against the conical face of recess 20 to exert an axial pressure against the lock cylinder, tending to displace it outwardly but, as long as key 17a remains in the key hole, it will hold wedge 16 in radial slot 15 and prevent outward displacement of the lock cylinder. To counteract this pressure and to make it easier for the operator to move the lock cylinder back with the inserted key, a relatively weak coil spring 21 is mounted in recess 22 of lock barrel 2 to press against a flange on the lock cylinder and thus to press the lock cylinder back into a ready-to-rotate position. The bias of spring 9 must exceed that of spring 21 while spring 21 effectively restrains the lock cylinder from undue outward motion, the axial displacement and rotary positioning of lock cylinder 3 being fully described in my above-mentioned patent whose FIGS. 1 and 2 are structurally and functionally equivalent in this respect. In the rest position, lock cylinder 3 is axially inwardly displaced by spring 21. This inward displacement of the lock cylinder is limited by the engagement of cylinder head 3a with the shoulder of lock barrel 2 which defines its recessed chamber of enlarged diameter. When the key is withdrawn, lock cylinder 3 is pressed outwardly by the camming relationship of latch 11 and the conical face of recess 20 into the position illustrated in FIG. 2, in which it remains briefly, during which time the downwardly moving lock bolt moves latch 11 from its position engaging the conical face of recess 20 (FIG. 1) into its inactive position (FIG. 4), permitting the keeper of lock bolt 6 to snap into a matching recess in the steering column upon suitably turning the steering column to bring the keeper and recess into alignment. At the same time, coil spring 21 will bias the lock cylinder inwardly again into the axial position shown in FIG. 4. When the lock bolt is raised again against the bias of spring 9, the latch will snap back into engagement with the conical face of recess 20.

Split snap ring 21a serves as a shoulder for coil spring 21 and is positioned with control ring 19 on lock cylinder 3 after the latter has been slid into barrel 2. It then prevents removal of the lock cylinder from the barrel.

Behind the cylinder head 3a, lock cylinder 3 defines radial slot 18 in communication with keyhole 17. Wedge element 16 is slidably housed in the radial slot and lock barrel 2 has a radial recess 15 delimited by shoulder 15a which has an oblique face matching an oblique face of wedge element 16. As key 17a is withdrawn, as shown in FIG. 2, the above-described axial pressure will move lock cylinder 3 outwardly and this axial displacement of the lock cylinder moves wedge element 16 out of recess 15 to extend momentarily into keyhole 17. However, spring 21 will immediately move the lock cylinder back into the axial position shown in FIG. 4 and wedge element 16 will move by gravity back into radial recess 15. If friction or insertial should prevent this radial movement, when key 17a is introduced into the keyhole, the point of the key will contact the upper inclined face of wedge element 16 and, upon further inward movement of the key in the keyhole, will slide the wedge element radially outwardly out of the keyhole into recess 15 into the position shown in FIGS. 1 and 4.

Most of the above structure and function of the lock are more or less conventional and are more fully described and illustrated in their identical or equivalent form in my U.S. Pat. No. 4,031,728.

In accordance with the present invention, axially extending driver element 5, which is keyed to lock cylinder 3 for rotation therewith, is axially displaceable with respect to the lock cylinder and control means 24 is arranged on lock bolt 6 for displacing the driver element axially upon movement of lock bolt 6 between the retracted and locking positions. In the illustrated embodiment, the driver element extends through a slot 23 in the lock bolt from lock cylinder 3 into ignition circuit means 10 and a portion of driver element 5 extending through the slot 23 defines grooving 25. The control means comprises a pair of ribs 24 in the lock bolt slot 23, the ribs extending obliquely with respect to the axis and engaging grooving 25 in a diametrically opposed relation to the axis so as to hold the driver element between the ribs. Thus, when lock bolt 6 is advanced into the locking position, inclined ribs 24 will force driver element 5 to slide out of the ignition box. On the other hand, when the lock bolt is retracted, the driver element will slide into the ignition box. To facilitate the assembly, lock bolt 6 has a slot 23 (see FIG. 3) and housing 1 has a closure element 1a.

A lock arrangement of this type in manner similar to my earlier Patent at FIGS. 6–7, noted supra, has the particular advantage of providing a warning system effective if the key is left in the lock, in that control tibs 24 determine the axial position of driver element 5 and its cooperation with an actuating circuit for a buzzer in the ignition box may sound the buzzer until the bolt is completely advanced so that the keeper of lock bolt 6 engages the recess in the steering column before the buzzer discontinues sounding. Normally, the tip of the keeper first contacts the surface of the steering column and only snaps into its recess when the steering column is turned to align the keeper with the recess. With the present lock arrangement, the driver may be warned not only that the key was left in the lock but the buzzer may continue to sound as long as the steering column has not been locked so as to make certain that the steering column is turned into the proper position for locking.

I claim:

1. In a lock arrangement for a motor vehicle having a steering column, which comprises
   (a) a housing defining an axial bore and a cross bore intersecting therewith,
   (b) a key controlled lock cylinder mounted in the axial bore of the housing for rotation about the axis of the bore into selected operating positions, the key being insertable into the lock cylinder for rotation of the lock cylinder and withdrawable therefrom, the lock cylinder including
      (1) an axially extending driver element projecting inwardly from the lock cylinder,
   (c) an electrical ignition circuit means for starting the motor of the vehicle, the driver element extending into operative association with the ignition circuit means and being arranged to operate the circuit means on rotation of the lock cylinder into a selected one of the operating positions,
   (d) a lock bolt mounted in a cross bore for displacement between a retracted position and a locking position upon withdrawal of the key from the lock cylinder,
   (e) an operating spring biasing the lock bolt into the locking position,
      (1) the lock cylinder including a cam means for moving the lock bolt against the bias of the operating spring into the retracted position on rotation of the lock cylinder into another one of the selected operating positions, and
   (f) latch means for holding the lock bolt in the retracted position until the key has been withdrawn from the lock cylinder,
   (g) the improvement of the axially extending driver element being keyed to the lock cylinder for rotation therewith and being axially displaceable with respect to the lock cylinder, and further including a control means arranged on the lock bolt for displacing the driver element axially upon movement of the lock bolt between the retracted and locking positions.

2. In the lock arrangement of claim 1, the driver element extending through a slot in the lock bolt from the lock cylinder into the ignition circuit means, a portion of the driver element extending through the slot defining a grooving, and the contol means comprising a pair of ribs in the lock bolt slot, the ribs extending obliquely with respect to the axis and engaging the grooving in a diametrically opposed relation to the axis.

3. In the lock arrangement of claim 1 or 2, wherein the cam means comprises a control ring on the lock cylinder facing the lock bolt, the control ring defining a conical recess wherefrom there extends an axial bore receiving an end of the driver element.

4. In the lock arrangement of claim 3, the conical recess of the control ring being arranged to cooperate with the latch means for holding the lock bolt in the retracted position.

* * * * *